Aug. 6, 1946.   S. MOREAU ET AL   2,405,444
RADIOGRAPHIC FILTER
Filed Aug. 5, 1942   3 Sheets-Sheet 1
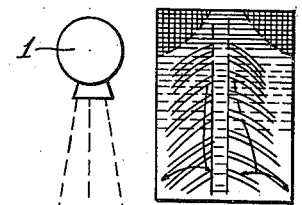
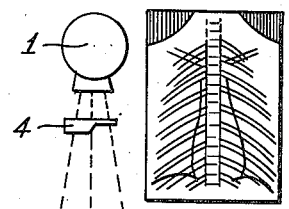
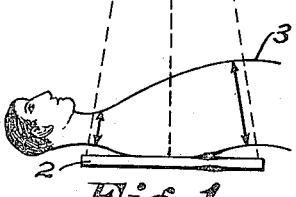
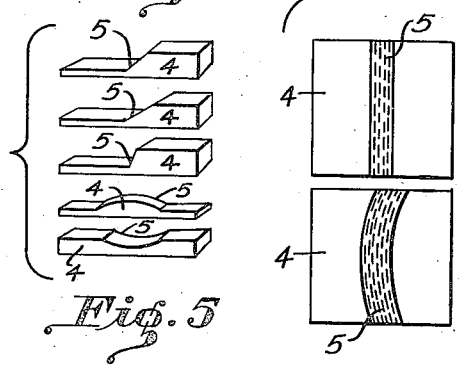
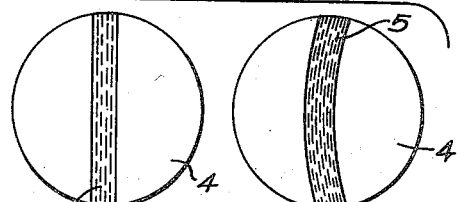
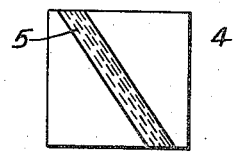
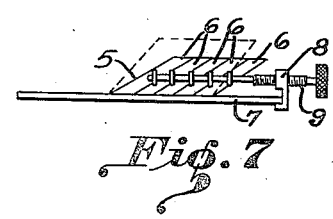
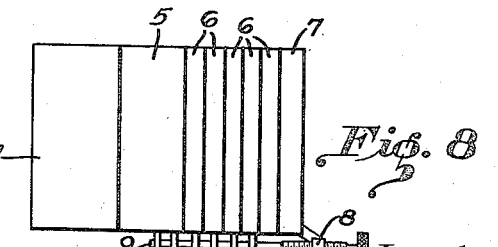
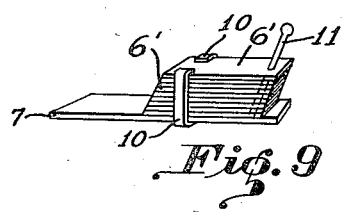
Inventors
Santiago Moreau,
Marcelo Heberto Moreau, &
Jorge Enrique Moreau.
By Glascock Downing & Seebold
Attorneys.

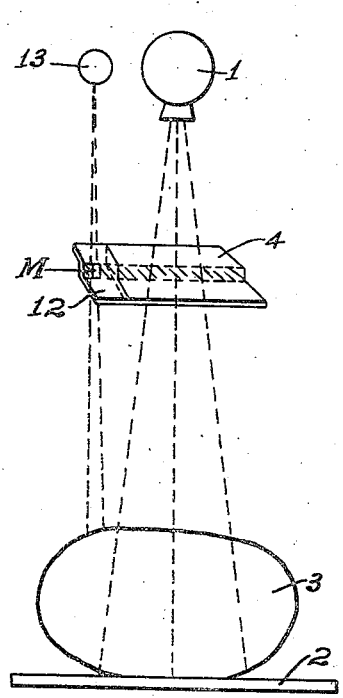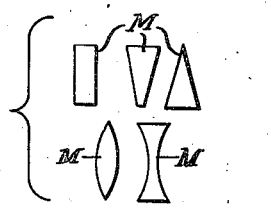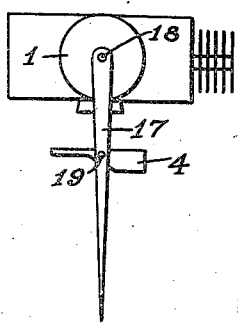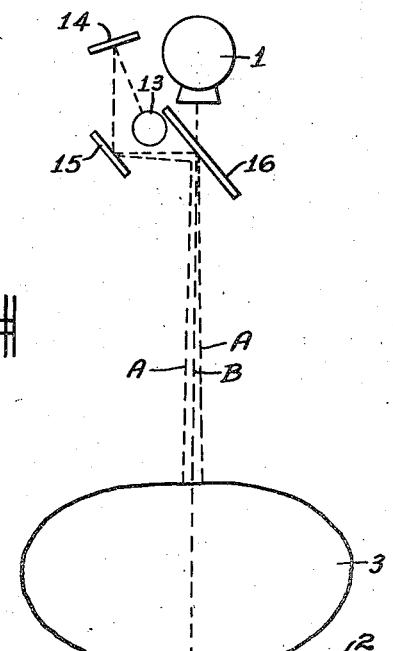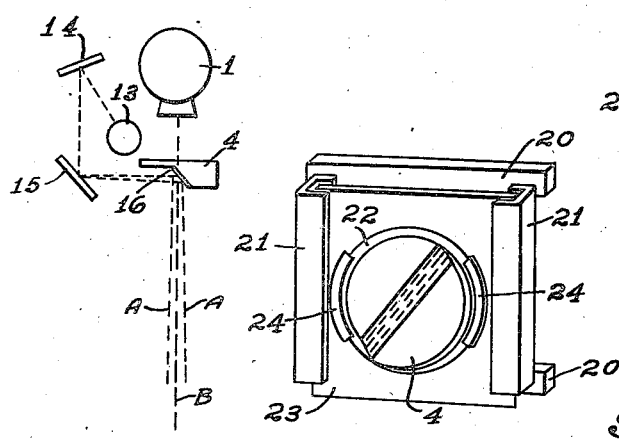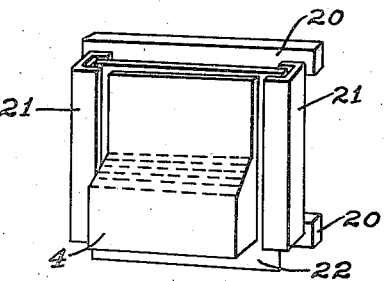

Aug. 6, 1946.      S. MOREAU ET AL      2,405,444
RADIOGRAPHIC FILTER
Filed Aug. 5, 1942      3 Sheets-Sheet 3
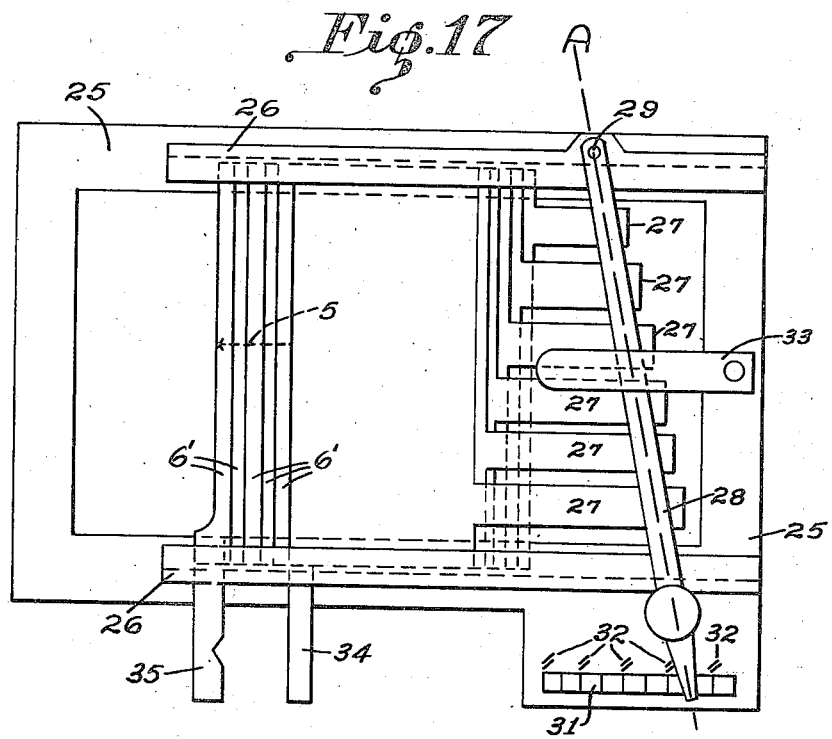
Fig.17
Fig.18
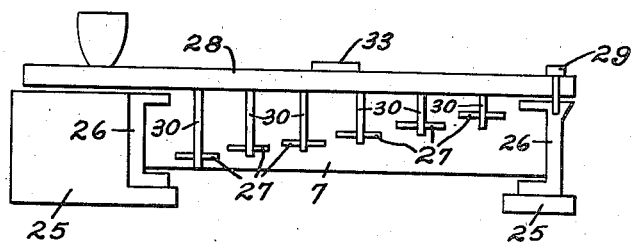
Inventors:
Santiago Moreau,
Marcelo Heberto Moreau,
& Jorge Ernique Moreau.
By Haecock Downing & Siebold
Attorneys.

Patented Aug. 6, 1946

2,405,444

UNITED STATES PATENT OFFICE 2,405,444

RADIOGRAPHIC FILTER

Santiago Moreau, Marcelo Heberto Moreau, and Jorge Enrique Moreau, Buenos Aires, Argentina Application August 5, 1942, Serial No. 453,707

7 Claims. (Cl. 250—86)

The present invention relates to improvements in radiography apparatus.

It is known that the interposed bodies give an image which varies with the radiographic density of said bodies. Consequently if the zone of the organism exposed to the rays is of different thickness, a normal image appears in one region of the radiographic film and a weak or too intense one in the other.

In order to obviate this inconvenience, a new method is proposed, consisting in interposing in the passage of the X-rays beam, a body functioning like a filter, in such a manner that the rays which pass through the zone of less thickness are screened.

The filter may be constructed of any appropriate material, for instance aluminium. Furthermore, it can be made of wood, ebonite, celluloid, or the like.

In its essentials the filter is composed of a very thin plate in one zone and a thicker one in the other, the transition from one to the other zone being effected in a gradual manner. In some cases the thinner zone may be dispensed with.

The thicker zone of the filter should never totally prevent the rays passing but screen them partially.

It is essential in some cases that the transition between the thicker and the thinner zone of the filter be gradual, but if necessary, the filters may also be constructed with abrupt transition zones.

The degree of the transition varies according to the relative distances focus-filter-film, and as the conditions in each case may necessitate.

The filter is set preferentially between the emitting focus of X-rays and the patient, and in certain cases between the patient and the radiographic chassis.

It is highly desirable to be able to determine, in effecting a radiography with filter, the location of the area to be filtered. For this purpose an indicator may be arranged which shows location of the X-rays beam which pass through the zone of variable density. This indicator may be a metallic or a wooden rod, or made of some other suitable materials and can be either extensible or not. The indication may also be achieved by means of a light beam. The light beam may pass through a small window united to the filter and following its movement when displaced. In the accompanying drawings:

Fig. 1 is a diagrammatic view illustrating the usual manner of obtaining radiographs.

Fig. 2 is a plan view of a radiograph showing the defects characteristic of the usual procedure.

Fig. 3 is a diagrammatic view illustrating the application of the invention.

Fig. 4 is a plan view of a radiograph produced in accordance with the invention.

Fig. 5 is a perspective view of a group of filters of different shapes and forms intended for various purposes.

Fig. 6 shows in plan a variety of forms of filters of rectangular and circular shape.

Fig. 7 is an elevation of one form of the invention by means of which the density of the filter may be altered to suit existing conditions.

Fig. 8 is a plan view of the form of filter shown in Fig. 7.

Fig. 9 is a perspective view of a modified type of filter.

Fig. 10 is a diagrammatic view illustrating an indicator associated with a filter for enabling the operator to determine the location of the area influenced by the region of the filter having a variable density.

Fig. 11 is a view illustrating various forms of elements used in connection with the indicator.

Figs. 12, 13 and 14 illustrate three further modified forms of the indicating device.

Figs. 15 and 16 are perspective views of two further modifications of the approved filters and adjustable mountings therefor.

Fig. 17 is a plan view of a further modified form of the filter embodying a device for indicating the area influenced by the region of the filter of variable density.

Fig. 18 is a cross section on the line A—B of Fig. 17.

Figure 1 represents schematically an arrangement for obtaining a radiography of the dorsal spine in which the difference of thickness of the higher and the lower part of the thorax may be appreciated (see arrows) which produces a defective radiography (Figure 2), by excess of rays in the upper part of the film. Figure 1 shows an X-ray tube 1, the radiographic chassis 2 with its radiographic film, and the patient 3. The obtained radiography (Fig. 2) presents an overexposed area in its upper part due to excess of X-rays.

Figure 3 shows the same elements of Figure 1, the filter 4 being incorporated. The obtained radiography (Figure 4) shows how the defect in Figure 2, has now disappeared.

In Figure 5 are shown various types of filters 4 of the type constructed of wood or ebonite, in which different shapes and degrees of inclination of inclined planes 5 are seen.

Figure 6 shows, in front view, several filters with various types of inclined planes 5.

Figure 7 shows a side view of a type of filter with varying inclined planes 5 and varying thickness. It is composed of a number of juxtaposed thin plates 6, pivoted on the panel 7. A screw-nut 8 joined to the panel 7 cooperates with a screwed metallic stem 9 which in its turn is linked with the thin plates 6. On rotating the stem 9, the plates 6 are inclined or raised and consequently the same occurs with the plane 5. In dotted lines is illustrated the position of the plates when the stem 9 is advanced.

Figure 9 shows another type of filter, composed of multiple superposed thin plates 6', maintained in position by the guides 10; the stem 11, which passes through the plates 6', being pivoted to the panel 7, serving to give the desired inclination to the inclined plane of the filter.

In order that the invention may be more clearly understood, the filters and the thin plates of the adjustable filters of Figures 7, 8 and 9 are illustrated in a thickness corresponding approximatively to that of wood, but in practice aluminium plates or similar material is employed. The movement of the thin plates 6' is achieved preferably through screw systems or the like.

The size of the filter will be smaller the nearer it is to the emitting focus of X-rays. Its dimension may be very reduced if there is precision in the added devices which indicate with accuracy the filtered zone, in the patient. If the filter is correctly placed on the radiographic chassis, the film must be totally covered.

Figure 10 shows schematically the X-ray tube 1, the radiographic filter 4, the body to be radiographed 3 and the chassis 2. There is also to be seen the plate 12 provided with the window M. A light focus 13, situated near the X-ray tube 1, projects its light through the window M, on the patient or body 3, or in its proximity. In this manner the light beam indicates with precision the X-ray zone which is filtered, on the same patient, on the chassis, or anywhere as the case may be.

The light beam can be emitted from a lamp, directly or through mirrors, lenses or the like.

As the case may be, the direction of the light beam can be varied at will, before or after the filter, by means of mirrors, prisms or the like. Furthermore, a combination between the mechanic and optic systems can be arranged for the same purpose.

Figure 11 shows several drawings of the window M. Preferably in each case and for each filter the type of window may be elected, whose projection indicates immediately the characteristics of the filter to which it belongs, arranging in such a manner that the broad zone of the window is in concordance with the thicker zone of the filter and vice versa. In case adjustable filters of the type of Fig. 9 are used, the shadow-projecting indicators will be solidary, preferably with the first and the last thin plate; in this way the obtained shadow, on the patient or on the radiographic chassis, indicates exactly the width of the variable zone of density.

Figure 12 shows schematically a focussing system of the light beam following the normal X-ray. The light beam emitted by the light focus 13 arrives at the mirror 14, whence it passes to the mirror 15, which sends it to the body 16, permeable to the X-rays and with reflecting surface, which reflects the light beam A upon the patient 3, accompanying the normal X-ray B. If constructively convenient, the light focus 13 may also be arranged approximately in the place of the mirror 14, removing the latter, or in the place of the mirror 15, eliminating both mirrors 15.

The systems of lenses are not illustrated which may be added to the optic system.

The body 16 is preferably a thin ebonite plate with polished surface to serve as a mirror, or a polished plate of Celluloid, or a thin and brilliant metallic sheet, fixed to a plate permeable to X-rays, or a very thin mirror, or any other material which acting as a reflector, does not interfere with the X-ray beam.

It is advisable to interpose in the passage of the light beam a body, partially or entirely opaque, and permeable to X-rays, so that its shadow indicates accurately on the body of the patient the point of incidence of normal X-rays. For that purpose several devices may be used: a thin sheet of transparent Celluloid with two black crossed lines, or a thin cardboard with small openings, or two thin narrow sheets made in black Celluloid or paper, cross-shaped, or any other device that may fulfill the same purpose.

Figure 13 shows such a body 16 applied to the inclined zone of a filter 4.

Figure 14 shows schematically an indicator 17 with its axis 18, fixed directly or indirectly to the X-ray tube and its pivot 19 located in coincidence with the region of the filter 4 of variable density. In this manner, any movement of the filter 4 in the sense of the body of the patient (in this case) will be registered by the indicator 17. In other words, the indicator allows the radiologist to filter the desired zones, in each case.

Figure 15 shows a filter 4 mounted on a support 20 equipped with rails 21. The support 20 should be fixed, directly or indirectly to the tube of X-rays. The filter 4 in its turn, is fixed to a panel 22 which is introduced into the rails 21 rigid with the support 20. The sliding of the filter, during the operation is effected according to the convenience of each case, in order to filter the desired zone. The movement may be effected simply with the hand, or by operating a device of greater precision with a gear, toothed bar, screws, or the like.

Figure 16 shows a circular filter 4, mounted on the panel 22 and connected to the board 23 by means of the curved rails 24, the filter can thus be moved lengthwise along the rails 21 and rotated (by means of the rails 24).

The support 20 will be equipped with means fixing it to the X-ray tube 1 or to the support of said tube.

Figures 17 and 18 show the combination of a type of filter of adjustable inclined plane, with the optical focussing of said inclined plane on the patient. A filter is shown, formed by the support 25, to which a plate 7 of aluminium or like material is fixed, similar to the same reference in Figure 9; furthermore, there can be seen the aluminium plates 6' which, in general, are of 0.10 or 0.20 mm. thickness each. These plates are preferably beveled, to contribute to form an inclined plane 5. The rails 26 serve as a guide to the longitudinal movement of the aluminium plates 6'. These plates each have an extension 27 with an orifice in its centre. The metallic stem 28 is pivoted at 29 and has perpendicular pins 30 which are entered into the orifices of the extensions 27. There is also a graduated scale 31, preferably toothed, with numerical indications 32. A spring plate 33, fixed to support 25 presses upon the stem 28 to maintain it in the desired position.

On moving the stem 28, the plates 6' slide one on the other varying the angle of the inclined plane. The degree of the angle of said plane is indicated in the scale 31. There is also shown the indicator 34, rigid with the most superficial plate 6', and the indicator 35 solidary with the plate 6' nearer to the plate 7. This indicator 35 has a notch; the shadow of the indicators 34 and 35 show on the patient or elsewhere, the location and extent of the zone of variable density of the filter; the image of the notch of the indicator 35 indicating on the patient the zone of less density of the filter. The luminous focus is arranged in the form illustrated in Figure 10. In the filter shown in the Figures 17 and 18, the plate 7 may be eliminated if desired, and the plates 6' instead of aluminium, may be made of any other suitable material and of the desired thickness in each case.

We claim:

1. An X-ray filter comprising a filter body having a region progressively varying in density in the direction of one dimension of said body, and means for altering the extent of said region of varying density.

2. An X-ray filter comprising a filter body having a region progressively varying in density in the direction of one dimension of said body, and means for altering the extent and position of said region of varying density.

3. An X-ray filter comprising a filter body having a region progressively varying in density in the direction of one dimension of said body, means for altering the extent of said region of varying density, and means for displacing said filter body in said direction.

4. An X-ray filter comprising a support, a filter body including a plurality of juxtaposed filtering members supported edgewise at an inclination on said support, and means for varying the inclination of said filtering members to vary the density characteristic of said filter body.

5. An X-ray filter comprising a support, a filter body including a plurality of juxtaposed filtering members supported edgewise at an inclination on said support, and an adjusting member common to the several filter members for varying the inclination thereof and also the density characteristic of the filter body.

6. An X-ray filter comprising a support, a filter body including a plurality of filtering members mounted flatwise one upon the other on said support, and an adjusting member carried by said support and passing through the several filtering members whereby upon adjustment thereof, the relative positions of the filtering members are varied.

7. An X-ray filter comprising a support, a filter body mounted on said support and having one end thereof disposed at an inclination to the direction of the X-ray beam to be filtered, to form a region progressively varying in density, and means for varying the angle of inclination of said end for altering the extent of said region of varying density.

SANTIAGO MOREAU.
MARCELO HEBERTO MOREAU.
JORGE ENRIQUE MOREAU.